(12) United States Patent
Esslinger et al.

(10) Patent No.: US 10,479,228 B2
(45) Date of Patent: Nov. 19, 2019

(54) POSITION-DETERMINING DEVICE FOR DETERMINING A POSITION OF A VEHICLE SEAT INSIDE A VEHICLE, SYSTEM, VEHICLE HAVING A VEHICLE SEAT ARRANGED INSIDE THE VEHICLE, AND METHOD FOR DETERMINING A POSITION OF A VEHICLE SEAT

(71) Applicant: Volkswagen Aktiengesellschaft, Wolfsburg (DE)

(72) Inventors: Daniel Esslinger, Braunschweig (DE); Jörg Winkler, Salzgitter (DE); Simon Bork, Calberlah OT Edesbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 53 days.

(21) Appl. No.: 15/746,619

(22) PCT Filed: Jul. 22, 2016

(86) PCT No.: PCT/EP2016/067525
§ 371 (c)(1),
(2) Date: Jan. 22, 2018

(87) PCT Pub. No.: WO2017/013245
PCT Pub. Date: Jan. 26, 2017

(65) Prior Publication Data
US 2018/0222349 A1 Aug. 9, 2018

(30) Foreign Application Priority Data
Jul. 23, 2015 (DE) .......................... 10 2015 213 891

(51) Int. Cl.
*G06F 7/00* (2006.01)
*B60N 2/02* (2006.01)
*B60N 2/06* (2006.01)

(52) U.S. Cl.
CPC ............. *B60N 2/0244* (2013.01); *B60N 2/06* (2013.01); *B60N 2002/0264* (2013.01); *B60N 2002/0272* (2013.01)

(58) Field of Classification Search
USPC .................................................... 701/36, 47
See application file for complete search history.

(56) References Cited

U.S. PATENT DOCUMENTS 5,324,071 A * 6/1994 Gotomyo ................. B60N 2/02
280/730.1
5,696,409 A * 12/1997 Handman ............ B60N 2/0224
307/10.1
(Continued)

FOREIGN PATENT DOCUMENTS

DE 102016213444 A1 1/1917 ............... B60N 2/02
DE 4236340 A1 5/1994 ............... B60R 5/00
(Continued)

OTHER PUBLICATIONS

DE 19882578 B4, U.S. Pat. No. 6,400,259 B1.
(Continued)

*Primary Examiner* — Masud Ahmed
(74) *Attorney, Agent, or Firm* — Slayden Grubert Beard PLLC (57) ABSTRACT

The invention relates to a position-determining device for determining a position of a vehicle seat inside a vehicle, wherein the position of the vehicle seat in the vehicle can be adjusted along an adjustment direction between a first and at least one second location, comprising a vehicle component and a vehicle seat component, wherein the vehicle component can be arranged in the vehicle as part of a vehicle
(Continued)

electronics system, and the vehicle seat component can be arranged in the vehicle seat as part of a vehicle seat electronics system, said vehicle seat component having at least one vehicle seat transmitting/receiving device and said vehicle component having at least two vehicle transmitting/receiving devices. The at least one vehicle seat transmitting/receiving device and the at least one of the vehicle transmitting/receiving devices are configured for a contactless transmission of information and/or energy, wherein the at least two vehicle transmitting/receiving devices are configured to be arranged offset to one another along the adjustment direction.

16 Claims, 5 Drawing Sheets

(56) References Cited

U.S. PATENT DOCUMENTS

| | | | | |
|---|---|---|---|---|
| 6,400,259 | B1* | 6/2002 | Bourcart | B60N 2/002 340/425.5 |
| 8,369,780 | B2* | 2/2013 | Bauer | H01F 38/14 455/41.1 |
| 8,907,662 | B2 | 12/2014 | Bauer et al. | 324/207.17 |
| 2007/0135982 | A1* | 6/2007 | Breed | B60J 10/00 701/36 |
| 2008/0234899 | A1* | 9/2008 | Breed | B60N 2/002 701/47 |
| 2008/0276191 | A1* | 11/2008 | Breed | B60N 2/002 715/771 |

FOREIGN PATENT DOCUMENTS

| | | | |
|---|---|---|---|
| DE | 102004050759 A1 | 4/2006 | B60R 16/023 |
| DE | 10164068 B4 | 6/2008 | B60R 21/01 |
| DE | 19882578 B4 | 7/2008 | B60R 16/027 |
| DE | 102009019994 A1 | 12/2009 | H02J 17/00 |
| DE | 102012016932 A1 | 2/2014 | B60N 2/005 |
| WO | 2011/073063 A1 | 6/2011 | B64D 11/06 |
| WO | 2017/013245 A1 | 1/2017 | B60N 2/02 |

OTHER PUBLICATIONS

DE 102009019994 A1, U.S. Pat. No. 8,369,780 B2.
International Search Report and Written Opinion, Application No. PCT/EP2016/067525, 23 pages, dated Nov. 7, 2016.
WO 2011/073063 A1, U.S. Pat. No. 8,907,662, B2.
German Office Action, Application No. 102016213444.2, 3 pages, dated Jun. 5, 2019.

* cited by examiner

POSITION-DETERMINING DEVICE FOR DETERMINING A POSITION OF A VEHICLE SEAT INSIDE A VEHICLE, SYSTEM, VEHICLE HAVING A VEHICLE SEAT ARRANGED INSIDE THE VEHICLE, AND METHOD FOR DETERMINING A POSITION OF A VEHICLE SEAT

CROSS-REFERENCE TO RELATED APPLICATIONS

This application is a U.S. National Stage Application of International Application No. PCT/EP2016/067525 filed Jul. 22, 2016, which designates the United States of America, and claims priority to DE Application No. 10 2015 213 891.7 filed Jul. 23, 2015, the contents of which are hereby incorporated by reference in their entirety.

TECHNICAL FIELD

The present invention relates to a position-determining device for determining a position of a vehicle seat inside a vehicle, wherein the position of the vehicle seat in the vehicle can be adjusted along an adjustment direction between a first and at least one second location, comprising a vehicle component and a vehicle seat component, wherein the vehicle component can be arranged stationarily in the vehicle as part of a vehicle electronics system, and the vehicle seat component can be arranged stationarily in the vehicle seat as part of a vehicle seat electronics system, said vehicle seat component having at least one vehicle seat transmitting/receiving device and said vehicle component having at least two vehicle-transmitting/receiving devices. The invention further relates to a system having a position-determining device and a processing device, a vehicle having a vehicle seat arranged inside the vehicle, wherein a position of the vehicle seat can be adjusted along an adjustment direction between a first and at least one second location, comprising a position-determining device for determining the position of the vehicle seat inside the vehicle and a method for determining a position of a vehicle seat inside a vehicle, wherein the vehicle seat can be adjusted along an adjustment direction between a first and at least one second location, using a position-determining device.

BACKGROUND

In modern vehicles, it is known to transmit information and/or energy between a vehicle electronics system and a vehicle seat electronics system. In particular, in this case, contactless transmitting devices may be used, see for example DE 10 2004 050 759 A1 or DE 101 64 068 B4. It is also known to configure vehicle seats to be adjustable such that they are adaptable to different users, for example. In particular, in this case the vehicle seats may be displaced along an adjustment direction in a linear manner inside the vehicle. Also, in particular in vehicles which are able to be modified, such as for example vans, vehicle seats may also be designed to be removable. In this case, it is advantageous to determine a position of the vehicle seat, in particular a location along the adjustment direction. Since the position of the vehicle seat may permit conclusions to be drawn about the size of the user, for example, a particularly high degree of safety may be provided by a deployment for a user of the vehicle seat which is adapted to a position of the vehicle seat, in particular by means of safety devices such as for example belt tensioners and/or airbags. In this case, further measures of the user, for example the weight, may also be determined by sensors and provided as information to the safety devices. According to the prior art, it is known to determine this position of the vehicle seat by additional external sensors, see also for example DE 10 2004 050 759 A1 or DE 101 64 068 B4. These sensors constitute additional components which have to be supplied with energy and generally increase the complexity of a vehicle seat and/or a vehicle.

SUMMARY

It is, therefore, an object of the present invention to remedy at least partially the drawbacks described in the preceding. In particular, it is an object of the invention to provide a position-determining device, a system, a vehicle, and a method for determining a position of a vehicle seat, which may improve in a particularly simple and cost-effective manner the determining of a position of a vehicle seat inside a vehicle, whereby in particular the complexity of a vehicle electronics system and/or vehicle seat electronics system may also be reduced.

The aforementioned object is solved by a position-determining device for determining a position of a vehicle seat inside a vehicle having the features of the independent claims. Further embodiments and details of the invention are apparent from the dependent claims, the description, and the drawings. In this case, embodiments and details, which are described in connection with the position-determining device according to the invention, certainly also apply in connection with the system according to the invention, the vehicle according to the invention, as well as the method according to the invention and in each case vice versa, so that in relation to the disclosure of the individual features of the invention, reference is, or respectively may be, always reciprocally made thereto.

BRIEF DESCRIPTION OF THE DRAWINGS

The invention will now be explained in detail on the basis of exemplary embodiment with reference to the drawings, wherein.

DETAILED DESCRIPTION OF EMBODIMENTS

According to a first aspect and in a corresponding embodiment, a position-determining device for determining a position of a vehicle seat inside a vehicle is provided, wherein the position of the vehicle seat in the vehicle can be adjusted along an adjustment direction between a first and at least one second location, comprising a vehicle component and a vehicle seat component, wherein the vehicle component can be arranged stationarily in the vehicle as part of a vehicle electronics system and the vehicle seat component can be arranged stationarily in the vehicle seat as part of a vehicle seat electronics system, said vehicle seat component having at least one vehicle seat transmitting/receiving device and said vehicle component having at least two vehicle transmitting/receiving devices.

A position-determining device according to this aspect is configured for a contactless transmission of information and/or energy between the at least one vehicle seat transmitting/receiving device and in each case one of the vehicle transmitting/receiving devices, and wherein further the at least two vehicle transmitting/receiving devices are able to be arranged offset to one another along the adjustment direction.

A position of a vehicle seat inside a vehicle may be determined by a position-determining device according to the present aspect. In the context of the present explanation, a "position" is understood, in particular, as a location along an adjustment direction in which the vehicle seat is located. The vehicle seat in this case may be held by rails, for example, wherein a linear adjustment of the vehicle seat along the rails is possible between at least two locations, and thus the rails predetermine the adjustment direction. The adjustment in this case may take place in fixedly adjustable discrete steps and/or continuously. Moreover, the vehicle seat may also be removable. Furthermore, in particular in the case of such a removable vehicle seat, an orientation or respectively an installation direction of the vehicle seat, in particular relative to the adjustment direction, may also constitute within the context of the invention, in particular with reference to the adjustment direction, a position of the vehicle seat. Certainly, provided it is technically expedient and possible, instead of a vehicle seat a position of a further component of the vehicle may also be determined, the position thereof being able to be adjusted along an adjustment direction.

A vehicle within the context of the invention may be in one embodiment a passenger motor vehicle, but certainly may also be a ship, aircraft or any other vehicle having a component which is adjustable along an adjustment direction in corresponding embodiments. The position-determining device in this case may have a vehicle component, which is configured such that it may form a part of the vehicle electronics system, in particular such that it may be integrated in the vehicle electronics system. Moreover, the position-determining device may have a vehicle seat component which correspondingly may form a part of a vehicle seat electronics system, and in particular may be integrated into the vehicle seat electronics system. As a result, an incorporation of the respective component into the respective electronics system, both in the vehicle and also in the vehicle seat, may be ensured in a particularly simple manner.

For a transmission of information and/or energy, transmitting/receiving devices are provided. In this embodiment, the vehicle seat component comprises at least one vehicle seat transmitting/receiving device and the vehicle component comprises at least two vehicle transmitting/receiving devices. The transmission in this case may take place in both directions, both from the vehicle to the vehicle seat and also vice versa. Information in this case may for example include sensor data, deployment signals, and/or control signals. Certainly, electrical energy is may be transmitted as energy.

According to the present aspect, it is provided that the respective transmitting/receiving devices are configured for the contactless transmission of information and/or energy. The transmission may be carried out, for example, inductively and/or capacitively. In case of an inductive transmission, the transmitting/receiving devices may comprise, for example, coupling coils. According to the present aspect, in particular for a transmission of information and/or energy between the vehicle electronics system and the vehicle seat electronics system, a transmission between the at least one vehicle seat transmitting/receiving device and at least one of the vehicle transmitting/receiving devices is sufficient. It may be essential in one embodiment that the at least two vehicle transmitting/receiving devices can be arranged offset to one another along the adjustment direction.

As part of the vehicle component of the position-determining device, therefore, the vehicle transmitting/receiving devices may be arranged in the installed state stationarily in the vehicle along the adjustment direction of the vehicle seat. The at least one vehicle seat transmitting/receiving device may be arranged stationarily in the vehicle seat as part of the vehicle seat component.

The arrangement/locations of the respective transmitting/receiving devices both in the vehicle and in the vehicle seat are known in this case. With an adjustment of the vehicle seat, therefore, the spacings of the individual vehicle transmitting/receiving devices are automatically altered relative to the at least one vehicle seat transmitting/receiving device. A strength and/or quality of a transmission between the transmitting/receiving devices, however, is directly dependent on this spacing, wherein when the spacing increases a strength and/or quality of the transmission is reduced. By establishing a transmission between each of the at least two vehicle transmitting/receiving devices and the at least one vehicle seat transmitting/receiving device, the respective strength and/or quality of the respective transmission may be determined, wherein a distance of the respective vehicle transmitting/receiving device from the at least one vehicle seat transmitting/receiving device may be deduced from this strength and/or quality of the transmission.

With a vehicle seat component having more than one vehicle seat transmitting/receiving device, an accuracy of the position-determining may be increased, for example, in particular with regard to an orientation, or respectively, an installation direction of the vehicle seat. In one embodiment, in this case, two vehicle seat transmitting/receiving devices, which are arranged for example on different sides of the vehicle seat relative to the adjustment direction, may be provided. Certainly, in case when a transmission cannot be established between any of the vehicle transmitting/receiving devices and the at least one vehicle seat transmitting/receiving device, for example, it is also possible to conclude that the vehicle seat has been removed from the vehicle.

In this manner, it is possible by using only the transmitting/receiving devices, to determine in a particularly simple manner, a position of the at least one vehicle seat transmitting/receiving device relative to the vehicle transmitting/receiving devices, and thus a position of the vehicle seat inside the vehicle. As already set forth in the preceding, both a location and an orientation of the vehicle seat in the vehicle may be determined, both of which are considered a "position" herein. As a result, use of additional external sensors may be avoided, whereby in particular the complexity of an electronics system, both of a vehicle electronics system and a vehicle seat electronics system, may be reduced.

In another embodiment of a position-determining device, it may be provided that the vehicle component and/or the vehicle seat component comprises an evaluation unit for determining the position of the vehicle seat. Such an evaluation unit may be is configured, in particular, for evaluating the processes of establishing a transmission of the individual vehicle transmitting/receiving devices to the vehicle seat transmitting/receiving device. As a result, in the evaluation unit, it is possible to determine and to evaluate the strengths and/or the qualities of the individual transmissions. A determination of a position of the vehicle seat, therefore, may be already possible in the evaluation unit. An evaluation and determination of the position in the remaining electronics system already present in the vehicle and/or in the vehicle seat may be avoided thereby in an embodiment. A further reduction in the complexity of the vehicle electronics system and/or vehicle seat electronics system may be achieved.

In another embodiment, a position-determining device according to the present aspect may be configured such that the vehicle transmitting/receiving devices are configured to be identical or at least substantially identical.

In the present context, "configured to be identical or at least substantially identical" in this case is understood, in particular, that said devices are constructed to be the same or at least substantially the same, at least with respect to the components for the transmission of information and/or energy, for example the vehicle transmitting/receiving devices. By an identical or at least substantially identical configuration of the vehicle transmitting/receiving devices, in particular time and cost may be saved during the production of the vehicle transmitting/receiving devices. Also, for example, an evaluation of the establishing processes between the individual vehicle transmitting/receiving devices and the vehicle seat transmitting/receiving device may be simplified thereby.

Certainly, also in the case of a vehicle seat component with several vehicle seat transmitting/receiving devices, it may be provided that these vehicle seat transmitting/receiving devices are configured to be identical or substantially identical, whereby correspondingly the same advantages may be achieved.

Moreover, in another embodiment, it may also be possible that a number and/or an arrangement of the vehicle transmitting/receiving devices is adapted to the adjustable positions of the vehicle seat. In this case, these adaptations may, e.g., take place, before an installation of the position-determining device in the vehicle.

Thus, for example, it may be expedient with a small adjustment path of the vehicle seat along the adjustment direction to provide a smaller number of vehicle transmitting/receiving devices than with a larger adjustment path. Cost, both during the production of a position-determining device according to the invention and also during the mounting thereof, may be saved thereby.

Using a corresponding arrangement of the vehicle transmitting/receiving devices, for example such that the entire adjustment path of the vehicle seat is covered by the vehicle transmitting/receiving devices, such that for each adjustable position of the vehicle seat a transmission of information and/or energy between the vehicle electronics system and the vehicle seat electronics system is possible, in particular the accuracy may also be increased when determining the position of the vehicle seat.

According to another embodiment, a position-determining device according to the present aspect may be configured such that the number and the arrangement of the vehicle transmitting/receiving devices may be adapted to a number and to the locations of fixedly adjustable positions of the vehicle seat.

This embodiment of a position-determining device is, in particular, advantageous for vehicle seats, which are able to be arranged along the adjustment direction in fixedly adjustable discrete positions. For example, rails in which the vehicle seat is adjustable along the adjustment direction may comprise latching options, which, e.g, may also be arranged at constant spacings. Using such latching options, the vehicle seat may be arranged in fixedly adjustable positions.

According to the present embodiment, it may be provided that the number and the arrangement of the vehicle transmitting/receiving devices are adaptable to this number and to these locations of the fixedly adjustable positions of the vehicle seat. In this context, "adaptable" may mean, e.g., that firstly the number of vehicle transmitting/receiving devices corresponds to the number of possible positions of the vehicle seat and, secondly, that the respective vehicle transmitting/receiving devices are arranged such that in each position of the vehicle seat exactly one vehicle transmitting/receiving device is as close as possible to the at least one vehicle seat transmitting/receiving device.

The vehicle transmitting/receiving devices in this embodiment are arranged spaced apart from one another at least along the adjustment direction. As a result, it may be ensured that a transmission of information and/or energy between this vehicle transmitting/receiving device and the at least one vehicle seat transmitting/receiving device, in particular in comparison with all other vehicle transmitting/receiving devices, has a particularly good strength and/or quality, whereby as a result a particularly reliable determination of the position of the vehicle seat may be provided.

In an alternative embodiment of a position-determining device, it may further be provided that the vehicle transmitting/receiving devices may be arranged such that they overlap along the adjustment direction and that a number of vehicle transmitting/receiving devices may be selected, such that for all possible positions of the vehicle seat, a contactless transmission of information and/or energy between the at least one of the vehicle transmitting/receiving devices and the at least one vehicle seat transmitting/receiving device can be conducted.

This embodiment of a position-determining device is particularly suitable for vehicle seats, which can be arranged continuously in positions along the adjustment direction. By this choice of a number of vehicle transmitting/receiving devices, it may, e.g., be ensured that the at least one vehicle seat transmitting/receiving device in the vehicle seat, in each position of the vehicle seat, may establish a transmission with at least one of the vehicle transmitting/receiving devices.

A transmission of information and/or energy may therefore be ensured for each position of the vehicle seat. Furthermore, due to the overlapping, the accuracy of determining the position of the vehicle seat may be increased. This may be based on the fact that, for each position of the vehicle seat, several vehicle transmitting/receiving devices are able to establish a transmission with the vehicle seat transmitting/receiving device, wherein each of the transmissions has a strength and/or quality depending on the distance of the respective vehicle transmitting/receiving device from the at least one vehicle seat transmitting/receiving device. Using a comparison of the strength and/or the quality of the individual transmissions, as a result, the position of the at least one vehicle seat transmitting/receiving device and thus the position of the entire vehicle seat may be determined, in particular with a continuously adjustable the vehicle seat along the adjustment direction.

In a further embodiment, a position-determining device according to the present aspect may be configured such that the at least one vehicle seat transmitting/receiving device has a damped electronic element, e.g., a damped electronic oscillating circuit. If a transmission cannot be established between any of the vehicle transmitting/receiving devices and the at least one vehicle seat transmitting/receiving device, normally it may be concluded that the vehicle seat has been removed. By means of a damped electronic element, e.g., a damped electronic oscillating circuit, however, when establishing a transmission, which is emitted from a vehicle transmitting/receiving device, energy is received even if the at least one vehicle seat transmitting/receiving device is defective and, therefore, a transmission cannot be established.

As a result, therefore, it may be possible to detect a defective vehicle seat transmitting/receiving device and, e.g., a faulty detection of a removal of the vehicle seat may be avoided.

Alternatively and/or additionally and in another embodiment, the vehicle seat component may also be configured for generating and transmitting a status signal. Such a status signal in this case may, for example, comprise a bit pattern. By means of such a status signal, such as in the case of a failure-free functioning of a vehicle seat transmitting/receiving device, it may be provided that the vehicle component functions correctly.

In another embodiment of a position-determining device according to the present aspect, it may also be provided that the vehicle seat transmitting/receiving device has a longitudinal extent in the direction of the adjustment direction, such that it at least partially covers at least two of the vehicle transmitting/receiving devices.

In this case, a vehicle transmitting/receiving device is always fully covered by the vehicle seat transmitting/receiving device and the at least one second vehicle transmitting/receiving device is partially covered. Here, the fully covered vehicle transmitting/receiving device may in one embodiment be used for the transmission of information and/or energy. The partially covered vehicle transmitting/receiving device may in another embodiment already be prepared, for example, with a movement of the vehicle seat in the direction of the partially covered vehicle transmitting/receiving device, to take over this transmission function. Also, a basic identification of a movement of the vehicle seat may be improved and facilitated by such a design of a vehicle seat transmitting/receiving device according to the present embodiment. Thus, an improvement of the robustness of the position-determining device and, in particular, an increase in a system speed, by which for example switching between the respectively used vehicle transmitting/receiving devices may be carried out, may be provided as a whole.

According to a second aspect and in another embodiment, a system, having a position-determining device according to the first aspect and a processing device, is provided. The processing device in this embodiment may be configured for processing the position of the vehicle seat, determined by the position-determining device. The position-determining device used in the system is configured according to the first aspect, described in the preceding. Accordingly, a system according to the current aspect brings the same advantages as have already been described in detail with reference to the position-determining device according to the first aspect. Furthermore, a system according to the current aspect has a processing device. This processing device may in an embodiment be configured for processing a position of a vehicle seat, which has been determined by a position-determining device according to the first aspect. As a result, it is possible in a particularly simple manner to use the position information for functions in the vehicle.

Furthermore, in a system according to the current aspect and in one embodiment, the processing device is a safety system of the vehicle. Such a safety system, for example, may be a restraining means, such as a belt and/or an airbag.

By a design of a processing device as a safety system, e.g., it may be possible to provide the functionality of the safety system depending on a position of the vehicle seat. Thus, in particular, conclusions may be drawn about the size/height of the user of the vehicle seat from a position of the vehicle seat, whereby in turn, an adaptive deployment of a restraining means, for example a belt force limiter, which is adapted to the user, may be provided.

In addition, for example, deployment times of airbags may also be adapted to a position of the vehicle seat, whereby in particular the safety of the user may be increased. Alternatively or additionally and in another embodiment, by means of the safety system, information and data from further sensors may also be taken into account. Thus, for example using a weight sensor, information about a user, in particular about the weight of the user or respectively about seat occupancy, may also be detected, said information being able to be evaluated for adapting an adaptive deployment of the restraining means.

In addition, a position of a backrest of the vehicle seat and/or a belt status, for example information about whether the belt is stretched or not stretched, may be evaluated in the safety system for adapting an adaptive deployment of the restraining means.

According to a third aspect and in a corresponding embodiment, a vehicle having a vehicle seat arranged inside the vehicle is provided, wherein a position of the vehicle seat can be adjusted along an adjustment direction between a first and at least one second location, comprising a position-determining device for determining the position of the vehicle seat inside a vehicle. A vehicle according to the current aspect comprises a position-determining device that is configured according to the first aspect, and/or a system according to the second aspect. In the latter case, the vehicle correspondingly has a position-determining device according to the first aspect. Accordingly, a vehicle according to the current aspect brings the same advantages as have been described in detail with reference to a position-determining device according to the first aspect, or respectively with reference to a system according to the second aspect.

According to a fourth aspect and in another embodiment, a method for determining a position of a vehicle seat inside a vehicle is provided, wherein the vehicle seat can be adjusted along an adjustment direction between a first and at least one second location, by using a position-determining device according to the first aspect. A method according to the current aspect comprises the following steps:

a) establishing a transmission between each of the at least two vehicle transmitting/receiving devices with the at least one vehicle seat transmitting/receiving device,
b) identifying at least the vehicle transmitting/receiving device and the vehicle seat transmitting/receiving device (11) with the best transmission, and
c) determining the position of the vehicle seat from the vehicle transmitting/receiving device identified in step b) and the vehicle seat transmitting receiving device (11) identified in step b).

A method according to the current aspect uses a position-determining device according to the first aspect for determining a position of a vehicle seat inside a vehicle. Accordingly, a method according to the current aspect brings the same advantages as have been described in detail with reference to a position-determining device according to the first aspect.

The position of the vehicle seat in this case can be adjusted between at least one first and one second location along an adjustment direction. For example, in the case of a removable vehicle seat, an orientation, or respectively, an installation direction of the vehicle seat, in particular relative to the adjustment direction, is also considered a "position" of the vehicle seat within the context of the invention.

In step a) of a method according to the present aspect, a transmission is established between each of the vehicle transmitting/receiving devices, which are present and the at least one vehicle seat transmitting/receiving device. This may take place, for example, in succession for the individual vehicle transmitting/receiving devices. The established transmissions will have a different strength and/or quality depending on the distance of the respective vehicle transmitting/receiving device from at least one vehicle seat transmitting/receiving device, wherein certainly the possibility is also included that establishing the transmission fails.

If the vehicle seat component has several vehicle seat transmitting/receiving devices, certainly, the strength and/or quality of the transmission may also differ if the transmission is established between different vehicle seat transmitting/receiving devices and the same vehicle transmitting/receiving device.

In step b) of a method according to the present aspect, subsequently, at least the combination of the vehicle transmitting/receiving device and the vehicle seat transmitting/receiving device, between which the best transmission could be established, is identified. In this context, the best transmission is the transmission with the greatest strength and/or highest quality. Since both the strength and the quality of the transmissions, in particular, depend on a distance of the respective vehicle transmitting/receiving device from the vehicle seat transmitting/receiving device used, and the positions of these components in the vehicle, or respectively in the vehicle seat, are known, in step c), a position, i.e., a location and/or an orientation of the vehicle seat, may be determined from this information.

In this simple and cost-effective manner, a determination of a position of a vehicle seat may be undertaken by using only the transmitting/receiving devices. As a result, a use of additional external sensors may be avoided, whereby in particular the complexity of an electronics system, both of a vehicle electronics system and a vehicle seat electronics system, may be reduced.

In another embodiment, it may further be provided that in a step d), which follows step c), a transmission of information and/or energy is carried out between the vehicle transmitting/receiving device identified in step b) and the vehicle seat transmitting/receiving device identified in step b).

Between the combination of a vehicle transmitting/receiving device and a vehicle seat transmitting/receiving device identified in step b), the best transmission and thus the transmission with the greatest strength and/or highest quality, has been determined. By the use of this combination for transmitting information and/or energy, therefore, during further operation, a particularly good transmission of information and/or energy between the vehicle electronics system and the vehicle seat electronics system may be ensured.

In another embodiment and in the case of an interruption of the transmission undertaken in step d), steps a), b) and c) are carried out again. Such an interruption of the transmission undertaken in step d), may for example be caused by an alteration of the position of the vehicle seat inside the vehicle. With a renewed execution of steps a), b) and c) of the method according to the present aspect, as already set forth above, a position of the vehicle seat inside the vehicle may be determined in a particularly simple and cost-effective manner. As a result, it is possible to determine alterations to a position of the vehicle seat in a particularly simple, rapid and reliable manner and to determine the new position of the vehicle seat.

In another embodiment and in the case of an unsuccessful conduction of step b), a removal of the vehicle seat is identified in step c).

An unsuccessful conduction of step b) means in this context that a transmission of information and/or energy could not be established between any of the vehicle transmitting/receiving devices and the at least one vehicle seat transmitting/receiving device. Additionally, when a damped electronic element is fitted in the at least one vehicle seat transmitting/receiving device, the absence of energy absorption may be monitored by the at least one vehicle seat transmitting/receiving device. From the unsuccessful conduction of attempting to establish a transmission in step b), it may for example be deduced that the at least one vehicle seat transmitting/receiving device is too far distant from all of the vehicle transmitting/receiving devices in order to be able to establish a transmission. This is the case, in particular, when the vehicle seat is removed. Thus, by a method according to the present aspect, a removal of the vehicle seat may also be identified in a particularly simple and cost-effective manner.

Further advantages, features, and details of the invention will be apparent from the following description, in which additional exemplary embodiments of the invention are described in detail with reference to the drawings. Elements having the same function and mode of operation are provided in the individual figures with the same reference numerals.

Figure 1:
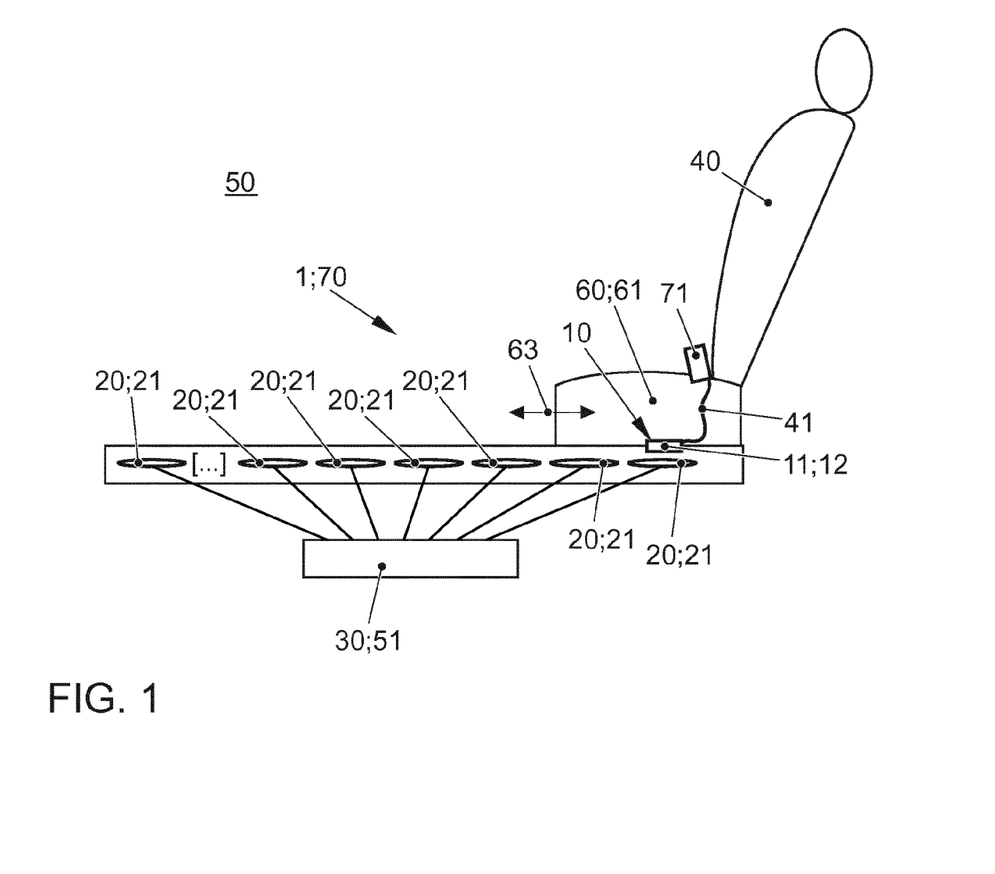
FIG. 1 shows a vehicle according to the invention with a vehicle seat in a first position.

FIG. 1 shows the interior of a vehicle 50 according in one possible embodiment, in which a vehicle seat 40 is arranged. The vehicle seat 40 is adjustable along an adjustment direction 63 and is located in the illustrated position 60 at a first location 61. The vehicle 50 further has a system 70 having a position-determining device 1. A vehicle seat component 10 of the position-determining device 1, which is arranged stationarily in the vehicle seat 40 and is part of a vehicle seat electronics system 41, has a vehicle seat transmitting/receiving device 11. As counterparts thereto, a vehicle component 20 of the position-determining device 1, which is arranged stationarily in the vehicle 50 and is part of a vehicle seat electronics system 51, has several vehicle transmitting/receiving devices 21. Each of these vehicle transmitting/receiving devices 21 is configured together with the vehicle seat transmitting/receiving device 11 for the contactless transmission of information and/or energy. The vehicle transmitting/receiving devices 21 are further connected to an evaluation unit 30, which is also configured as part of the vehicle electronics system 51. In order to determine a position 60 of the vehicle seat 40, a transmission to the vehicle seat transmitting/receiving device 11 is established from each of the vehicle transmitting/receiving devices 21. The strength and/or quality of these transmissions in this case is dependent, in particular, on a distance between the respective vehicle transmitting/receiving device 21 and the vehicle seat transmitting/receiving device 11. In the embodiment shown, by an evaluation of the individual transmissions carried out in the evaluation unit 30, therefore, the vehicle transmitting/receiving device 21 by which the best transmission may be established with the vehicle seat transmitting/receiving device 11 may be determined. Since the arrangement of the locations of the vehicle transmitting/receiving devices 21 and the vehicle seat transmitting/receiving device 11 are known, a position 60 of the vehicle seat 40 may also be determined thereby in a particularly simple and cost-effective manner, in particular without the use of additional sensors.

Furthermore, in FIG. 1, a processing device 71 is shown, which together with the position-determining device 1, is part of a system 70. The processing device 71 in the illustrated embodiment is a safety system, in particular as illustrated, such as for example a belt force limiter. With system 70, it may be possible to use the position 60 of the vehicle seat 40 determined by the position-determining device 1. Thus, for example, by means of a processing device 71, which is configured as a safety system, a belt force corresponding to a position 60 of the vehicle seat 40 may be limited. As a result, for example, the size of a user of the vehicle seat 40 which generally correlates to the adjusted position 60 of the vehicle seat 40 may be taken into account. Also, further safety systems, such as for example airbags or the like, may be used in a more adaptive manner and thus more effectively by a use as a processing device 71.

In alternative or additional embodiments, such a processing device 71 may also have other, or respectively further, elements, for example a seat occupation detection mat and/or similar sensor elements. An evaluation of the sensor information in this case may take place directly in the system 70, but also in the evaluation unit 30, after a transmission of the information about the vehicle seat transmitting/receiving device 11 to the vehicle transmitting/receiving device 21.

Additionally, the vehicle seat transmitting/receiving device 11 in the illustrated embodiment has a damped electronic element 12. By means of such a damped electronic element 12, which for example may be a damped electronic oscillating circuit, when a vehicle transmitting/receiving device 21 attempts to establish a transmission, energy is received by the vehicle seat transmitting/receiving device 11 even if the vehicle seat transmitting/receiving device 11 is defective. However, a transmission is not established between one of the vehicle transmitting/receiving devices 21 and the vehicle seat transmitting device 11. Thus, a defect of the vehicle seat component 10, and in particular the vehicle seat transmitting/receiving device 11, may be detected. In the case that none of the vehicle transmitting/receiving devices 21 being able to establish a transmission with the vehicle seat transmitting/receiving device 11, and no energy being received, a removal of the vehicle seat 40 may be deduced.

Figure 2:
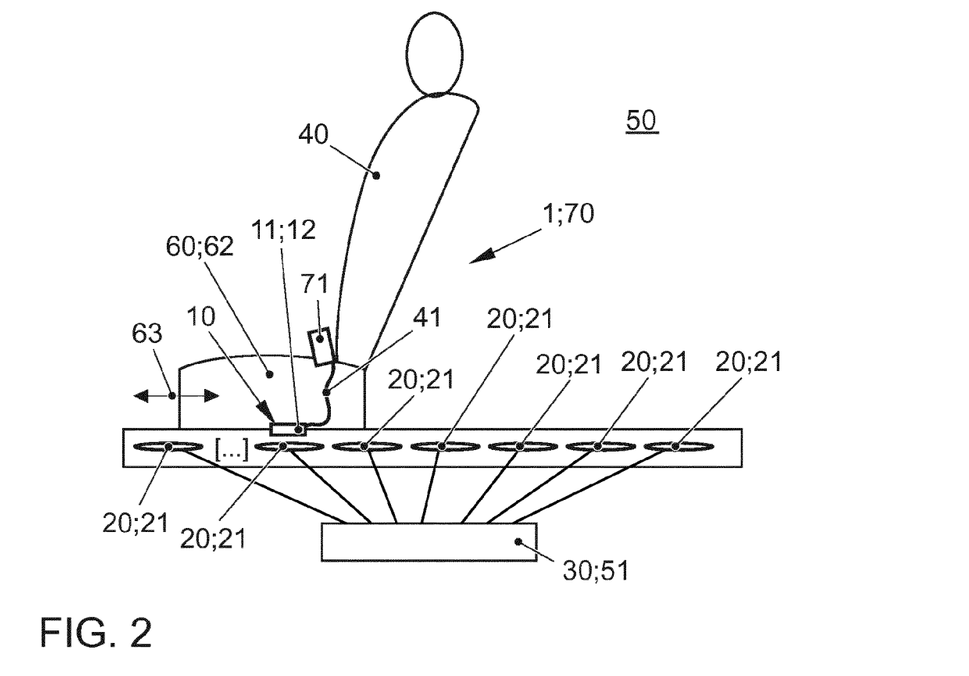
FIG. 2 shows a vehicle according to the invention with a vehicle seat in a second position.

In FIG. 2, the embodiment already shown in FIG. 1 of the interior of a vehicle 50 is illustrated again, wherein the position of the vehicle seat 40 has now been altered into a second location 62. All of the features and advantages which have been described with reference to FIG. 1 are thus also applicable with reference to the components illustrated in FIG. 2. It is clearly visible that now in comparison with FIG. 1, another of the vehicle transmitting/receiving devices 21 forms the transmitting/receiving device next to the vehicle seat transmitting/receiving device 11. Since, as described above with reference to FIG. 1, a strength and/or quality of the transmission established between the respective vehicle transmitting/receiving device 21 and the vehicle seat transmitting/receiving device 11 depends on the relative distance thereof, it is particularly clear that, by determining the vehicle transmitting/receiving device 21 with the best transmission, the determining of a position 60 of the vehicle seat 40 is possible, in particular, simply by using the transmitting/receiving devices 11, 21. Since as a result, in particular, additional sensors may be dispensed with, this represents a particularly simple and cost-effective way of determining a position.

Figure 3:
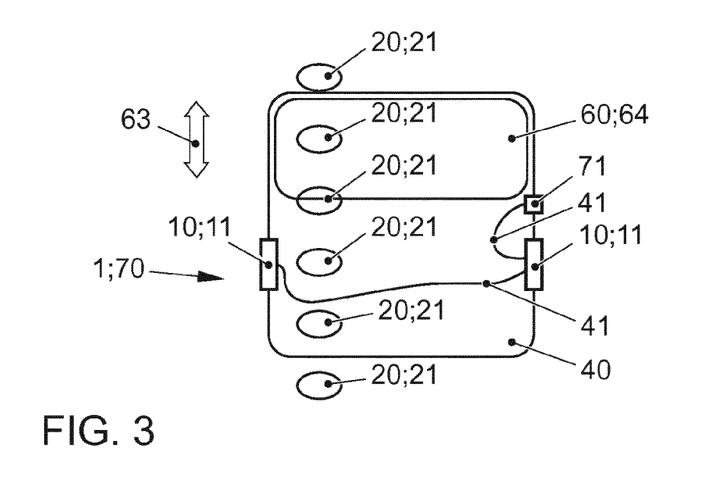
FIG. 3 shows an embodiment of a vehicle seat with two vehicle seat transmitting/receiving devices.
Figure 4:
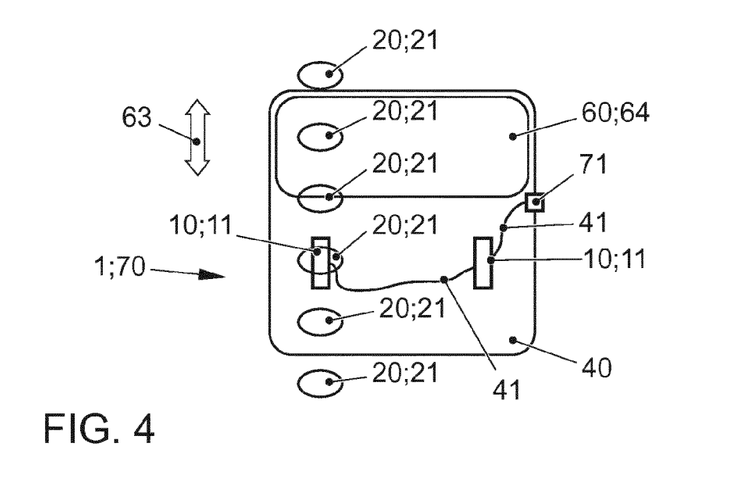
FIG. 4 shows a further embodiment of a vehicle seat with two vehicle seat transmitting/receiving devices.
Figure 5:
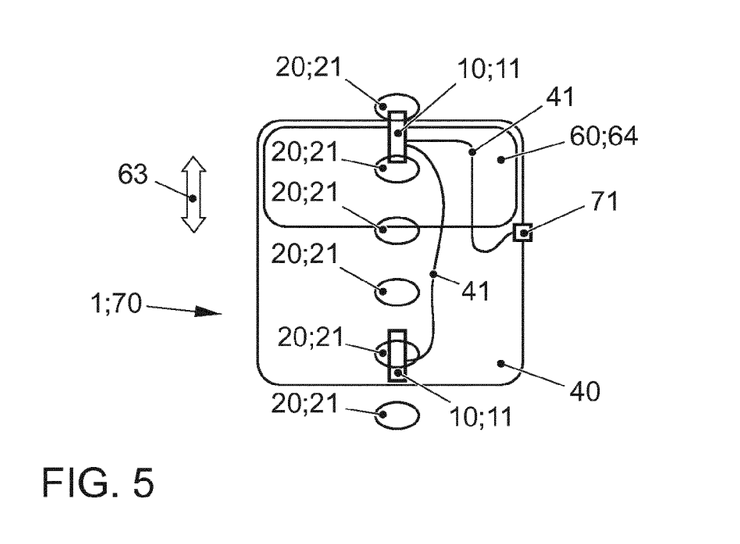
FIG. 5 shows a further embodiment of a vehicle seat with two vehicle seat transmitting/receiving devices.

In FIGS. 3, 4, and 5, and in each case schematically, a system 70 with a position-determining device 1 is shown, in which the vehicle seat component 10 in each case comprises two vehicle seat transmitting/receiving devices 11. Furthermore, the vehicle transmitting/receiving devices 21 of the vehicle component 20 are also shown, said transmitting/receiving devices being arranged offset along an adjustment direction 63. For improved clarity, the vehicle seat 40 is shown schematically only and, in particular, transparent. Due to the presence of two vehicle seat transmitting/receiving devices 11, it is possible in a particularly simple manner to determine an orientation 64, or respectively an installation direction of the vehicle seat 40 relative to the adjustment direction 63, as a position 60, to evaluate this in an evaluation unit 30 (not illustrated), and to supply to a processing device 71, which is configured in the illustrated embodiments as a belt buckle. The two embodiments, shown by way of example in FIGS. 3 and 4, substantially differ by the different arrangement of the vehicle transmitting/receiving devices 21 and, in particular, the vehicle seat transmitting/receiving devices 11. In the following, details are provided about the determination of an orientation 64 of the vehicle seat 40, wherein certainly, a determination of a location 61, 62 (not illustrated) of the vehicle seat 40 is also possible, for example as already described above.

In FIG. 3, the vehicle seat transmitting/receiving devices 11 are arranged on different sides of the vehicle seat 40 relative to the adjustment direction 63. Together with the arrangement of the vehicle transmitting/receiving devices 21, which are arranged parallel to the adjustment direction 63, but not centrally below the vehicle seat 40, this automatically results in a shorter spacing for one of the two vehicle seat transmitting/receiving devices 11 relative to each of the vehicle transmitting receiving devices 21 than for the other of the two vehicle seat transmitting/receiving devices 11.

Because, on one hand, this spacing clearly influences a strength and/or quality of the transmission, since when the spacing increases, the strength and/or quality of the transmission reduces, and on the other hand, since the arrangement of the locations of the individual transmitting/receiving devices 11, 21 is known, it may be determined in a particularly simple manner, which of the two vehicle seat transmitting/receiving devices 11 is arranged in the vicinity of the vehicle transmitting/receiving devices 21. As a result, a determination of the orientation 64, or respectively the installation direction, of the vehicle seat 40 is possible in a particularly simple manner.

As an alternative to the embodiment shown in FIG. 3, the two vehicle seat transmitting/receiving devices 11 may be arranged in the vehicle seat 40 such that, with an installed vehicle seat 40, one of the transmitting/receiving devices 11 is located directly above the vehicle transmitting receiving devices 21, arranged along the adjustment direction 63. This is shown in FIG. 4.

In this manner, a spacing between the vehicle seat transmitting/receiving device 11 and the adjacent vehicle transmitting/receiving device 21 may be minimized. As a result, a particularly effective and reliable transmission of information and/or energy may be enabled between this vehicle seat transmitting/receiving device 11 and the adjacent vehicle transmitting/receiving device 21. The remaining elements of the embodiment of a position-determining device 1 illustrated in FIG. 4 are configured as in the embodiment illustrated in FIG. 3, so that with respect to these elements, reference is made to the description of FIG. 3.

A further alternative embodiment of a system 70 is shown in FIG. 5. Here, both the vehicle transmitting/receiving devices 21 and the vehicle seat transmitting/receiving devices 11 are arranged parallel to the adjustment direction 63 and centrally to, or respectively in, the vehicle seat 40. In this embodiment with a fixed position 60 of the vehicle seat 40, each of the two vehicle seat transmitting/receiving devices 11 are able to establish the best transmission to another of the vehicle transmitting/receiving devices 21. Since the arrangement/locations of the individual transmitting/receiving devices 11, 21 is/are known, it may also be determined in which orientation 64 the vehicle seat 40 is arranged in the vehicle 50.

Figure 6:
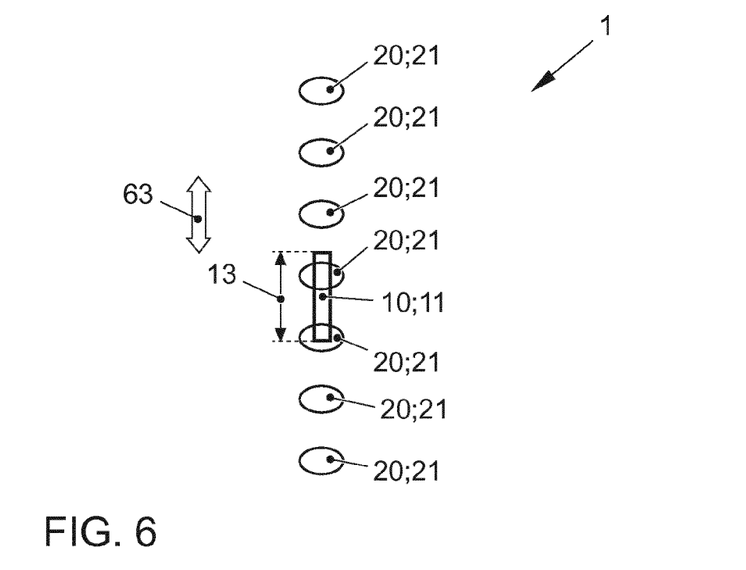
FIG. 6 shows a further embodiment of a vehicle seat transmitting/receiving device.

FIG. 6 shows schematically a possible embodiment of a vehicle seat transmitting/receiving device 11 of the vehicle seat component 10 of a position-determining device 1. Here, several vehicle transmitting/receiving devices 21 of the vehicle component are illustrated adjacent to the vehicle seat transmitting/receiving device 11, said vehicle transmitting/receiving devices being arranged uniformly along an adjustment direction 63. Further elements of a position-determining device 1 are not illustrated. It may be clearly identified that the vehicle seat transmitting/receiving device 11 in the direction of the adjustment direction 63 has a longitudinal extent 13, such that at any time it at least partially covers at least two of the vehicle transmitting/receiving devices 21. In this case, the fully covered vehicle transmitting/receiving device is used for transmitting information and/or energy. The partially covered vehicle transmitting/receiving device 21 may, already be prepared, with a movement of the vehicle seat 40 (not illustrated) in the direction of the partially covered vehicle transmitting/receiving device 21, to take over this transmission function. An identification of such a movement of the vehicle seat may also be improved and simplified by such a design of a vehicle seat transmitting/receiving device 11. An improvement in the robustness of the position-determining device 1 and, in particular, an increase in a system speed at which, for example, switching between the respectively used vehicle transmitting/receiving devices 21 may be carried out, may be provided thereby.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

1 Position-determining device
10 Vehicle seat component
11 Vehicle seat transmitting/receiving device
12 Electronic element
13 Longitudinal extent
20 Vehicle component
21 Vehicle transmitting/receiving device
30 Evaluation unit
40 Vehicle seat
41 Vehicle seat electronics system
50 Vehicle
51 Vehicle electronics system
60 Position
61 First location
62 Second location
63 Adjustment direction
64 Orientation
70 System
71 Processing device

What is claimed is:

1. A position-determining device for determining a position of a vehicle seat inside a vehicle, wherein the position of the vehicle seat in the vehicle can be adjusted along an adjustment direction at least between a first and at least one second location, comprising a vehicle component and a vehicle seat component, wherein the vehicle component can be arranged in the vehicle as part of a vehicle electronics system, and the vehicle seat component can be arranged in the vehicle seat as part of a vehicle seat electronics system, said vehicle seat component having at least one vehicle seat transmitting/receiving device and said vehicle component having at least two vehicle transmitting/receiving devices that are seat-specific for communication with the at least one vehicle seat transmitting/receiving device of a specific seat, wherein
    the at least one vehicle seat transmitting/receiving device and at least one of the vehicle transmitting/receiving devices are configured for a wireless transmission of one or more of information and energy and wherein the at least two vehicle transmitting/receiving devices are configured to be arranged offset spaced from each other along the adjustment direction.

2. The position-determining device according to claim 1, wherein the vehicle component and/or the vehicle seat component comprises an evaluation unit for determining the position of the vehicle seat.

3. The position-determining device according to claim 1, wherein the vehicle transmitting/receiving devices are identical or at least substantially identical.

4. The position-determining device according to claim 1, wherein the number and/or the arrangement of the vehicle transmitting/receiving devices is adapted according to the adjustable positions of the vehicle seat.

5. The position-determining device according to claim 4, wherein the number and the arrangement of the vehicle transmitting/receiving devices are adapted to a number of locations of fixedly adjustable positions of the vehicle seat.

6. The position-determining device according to claim 4, wherein the vehicle transmitting/receiving devices can be arranged such that they overlap along the adjustment direction and in that a number of vehicle transmitting/receiving devices can be selected such that for all possible positions of the vehicle seat, a wireless transmission of information and/or energy can be conducted between at least one of the vehicle transmitting/receiving devices and the at least one vehicle seat transmitting/receiving device.

7. The position-determining device according to claim 1, wherein the at least one vehicle seat transmitting/receiving device comprises a damped electronic element, in particular a damped electronic oscillating circuit.

8. The position-determining device according to claim 1, wherein the vehicle seat transmitting/receiving device has a longitudinal extent in the direction of the adjustment direction, such that it at least partially covers at least two of the vehicle transmitting/receiving devices.

9. A system having a position-determining device according to claim 1 and a processing device, which is configured for processing the position of the vehicle seat determined by the position-determining device.

10. The system according to claim 9, wherein the processing device is a safety system of the vehicle.

11. A vehicle having a vehicle seat arranged inside the vehicle, wherein a position of the vehicle seat can be adjusted along an adjustment direction between a first and at least one second location, comprising a position-determining device for determining the position of the vehicle seat inside a vehicle, wherein the position-determining device is configured according to claim 1.

12. A method for determining a position of a vehicle seat inside a vehicle, wherein the vehicle seat can be adjusted along an adjustment direction at least between a first and at least one second location, by using a position-determining device according to one of claim 1, the method comprising:
  a) establishing a transmission between each of the at least two vehicle transmitting/receiving devices with the at least one vehicle seat transmitting/receiving device;
  b) identifying at least the vehicle transmitting/receiving device and the vehicle seat transmitting/receiving device with the best transmission; and
  c) determining the position of the vehicle seat from the vehicle transmitting/receiving device identified in step b) and the vehicle seat transmitting/receiving device identified in step b).

13. The method according to claim 12, wherein in a step d), which follows step c), a transmission of information and/or energy is conducted between the vehicle transmitting/receiving device identified in step b) and the vehicle seat transmitting/receiving device identified in step b).

14. The method according to claim 13, wherein in the case of an interruption of the transmission of step d), the steps a), b) and c) are repeated.

15. The method according to claim 12, wherein in the case of an unsuccessful execution of step b), a removal of the vehicle seat is identified in step c).

16. A vehicle having a vehicle seat arranged inside the vehicle, wherein a position of the vehicle seat can be adjusted along an adjustment direction between at least a first and at least one second location, comprising a position-determining device for determining the position of the vehicle seat inside a vehicle, wherein the vehicle has a system according to claim 9.

* * * * *